United States Patent
Sung et al.

(10) Patent No.: US 8,476,938 B2
(45) Date of Patent: Jul. 2, 2013

(54) DEVICE AND METHOD FOR GENERATING THREE MODE SIGNAL

(75) Inventors: Joon Youp Sung, Gyeonggi-do (KR); Jung Sun Kwon, Gyeonggi-do (KR); Jae Shin Lee, Gyeonggi-do (KR); Seung Kon Kong, Gyeonggi-do (KR); Jung Hyun Kim, Gyeonggi-do (KR); Bo Hyun Hwang, Gyeonggi-do (KR)

(73) Assignee: Samsung Electro-Mechanics Co., Ltd. (KR)

( * ) Notice: Subject to any disclaimer, the term of this patent is extended or adjusted under 35 U.S.C. 154(b) by 188 days.

(21) Appl. No.: 13/027,689

(22) Filed: Feb. 15, 2011

(65) Prior Publication Data
US 2012/0068738 A1    Mar. 22, 2012

(30) Foreign Application Priority Data
Sep. 16, 2010    (KR) .................. 10-2010-0090996

(51) Int. Cl.
 *H03K 5/153*    (2006.01)
(52) U.S. Cl.
 USPC .............................. 327/77; 327/72
(58) Field of Classification Search
 USPC ......................... 327/63, 77, 72, 82
 See application file for complete search history.

(56) References Cited

U.S. PATENT DOCUMENTS

| | | | |
|---|---|---|---|
| 6,249,158 B1 * | 6/2001 | Schillhof et al. | 327/124 |
| 6,259,311 B1 * | 7/2001 | Azimi et al. | 327/553 |
| 6,429,727 B1 | 8/2002 | Gibson et al. | |
| 6,429,729 B2 * | 8/2002 | Kobayashi et al. | 327/540 |
| 6,696,859 B2 * | 2/2004 | Yagishita et al. | 326/82 |
| 7,697,415 B2 * | 4/2010 | Dugan et al. | 370/216 |
| 7,936,202 B2 * | 5/2011 | Pham | 327/312 |
| 7,990,205 B2 * | 8/2011 | Jung | 327/536 |

FOREIGN PATENT DOCUMENTS

| | | |
|---|---|---|
| JP | 2000-278789 | 10/2000 |
| JP | 2005-260922 | 9/2005 |

* cited by examiner

*Primary Examiner* — Quan Tra
(74) *Attorney, Agent, or Firm* — Lowe Hauptman Ham & Berner, LLP

(57) ABSTRACT

The device for generating three mode signals includes: a voltage setting block including an input terminal receiving three input signals of driving voltage, open, and ground and setting three voltages according to the three input signals; and an output block including two output terminals and a second node B receiving the three voltages from the voltage setting block, and outputting three combined signals by comparing an input voltage with a reference voltage, whereby only a small number of resistors and amplifiers generates three mode signals to further reduce the chip size than the related art and the external power source is not required to solve the problems of the related art due to noise.

6 Claims, 3 Drawing Sheets

DEVICE AND METHOD FOR GENERATING THREE MODE SIGNAL

CROSS REFERENCE TO RELATED APPLICATION

This application claims the benefit under 35 U.S.C. Section [120, 119, 119(e)] of Korean Patent Application No. 10-2010-0090996, entitled "Device And Method For Generating Three Mode Signal", filed on Sep. 16, 2010, which is hereby incorporated by reference in its entirety into this application.

BACKGROUND OF THE INVENTION

1. Technical Field

The present invention relates to a device and a method for generating three mode signals, and more particularly, to a device and a method for generating three mode signals capable of outputting three mode signals using a single input terminal Pin without using a separate external power source, in setting a current mode determining brightness of an LED.

2. Description of the Related Art

An organic light emitting diode (LED) has been prevalently used in various fields such as lighting, a backlight unit (BLU), or the like. Recently, the market for the organic light emitting diode (LED) has expanded quickly and relevant technologies have rapidly developed accordingly.

The miniaturization and lightness of electronic devices has greatly been of interest over the decades. Recently, there has been a need for a function capable of displaying three or more modes by using a single pin while improving functions of a chip.

Meanwhile, the setting and control of the LED current may be determined by a dimming signal (ADIM) and a resistance (RLED) parameter. In order to vary resistance, the resistance should be separately controlled by a variable resistor and should be controlled by replacing a resistor. Depending on the situation, it is difficult to vary current while replacing the resistor. Therefore, in order to represent three or more outputs by using a single pin, a scheme of varying the dimming signal and setting current has been prevalently used.

The related arts are represented by three or more outputs by controlling the above-mentioned dimming signal, which are a single wire control scheme added with a separate digital block, a single wire clock counting scheme, an analog dimming scheme using an analog input, or the like.

In this case, when the digital block is applied, it is possible to represent various levels of outputs. However, as the number of levels is increased, there are problems in that the circuit is complicated and the chip size is increased.

Further, when the analog dimming scheme is applied, it can set various outputs but reflects noise of an input to an output as it is. As a result, since a high-precision and noise-resistant external power source is separately needed, there are problems in that the chip size is increased and the product cost is increased.

FIG. 1 shows a method of setting an LED current using a clock according to the related art.

When a clock signal input to an input terminal is counted in a clock counter and is transferred to a digital analog converter, it is possible to vary a level of an analog transformation dimming voltage corresponding to the number counted in the digital analog converter. The ADIM voltage is generally set in one direction. For example, if it is assumed that a resolution of the ADIM is 1/10 and it is 10 mA per one clock, it is continuously increased from 10 mA→(to?) 20 mA→. . . →100 Ma according to the number of clocks and is reset to 0 mA in a subsequent clock and is again increased from 10 mA according to the clock.

FIG. 2 shows a method of setting an LED current by an external analog dimming method of the related art.

Since the LED current is changed according to a direct input of the ADIM voltage, the LED current is increased or reduced in two directions according to the fluctuation of the external ADIM voltage and the LED current is changed according to the applied voltage without a separate additional circuit since the direct voltage is controlled by the analog signal.

However, as described above, there are problems in that both of the methods need the external power source, make the chip size large, are sensitive to the noise of the input signal, or the like.

SUMMARY OF THE INVENTION

An object of the present invention is to provide a device and method for generating three mode signals by using a single pin and without using a separate external power source.

In detail, the present invention provides a device and method for finally generating three mode signals by applying a driving voltage VDD and a signal of a ground (GND) and an open or float OPEN or FLOAT state to an input terminal.

According to an exemplary embodiment of the present invention, there is provided a device for generating three mode signals, including: a voltage setting block including an input terminal receiving three input signals of driving voltage, open, and ground and setting three voltages according to the three input signals; and an output block including two output terminals and a second node B receiving the three voltages from the voltage setting block, and outputting three combined signals by comparing an input voltage with a reference voltage.

The voltage setting block may include: a first resistor R1 whose one terminal is connected to the input terminal; a second resistor R2 whose one terminal is applied with power voltage; a third resistor R3 whose one terminal is grounded; and a first node A connected to the other terminals of the first resistor, the second resistor, and the third resistor.

The voltage setting block may include: a first resistor R1 whose one terminal is connected to the input terminal; a first MOS transistor M1 whose gate is applied with a first MOS reference voltage VM1 and drain is applied with power voltage Vs and having a breakdown voltage Vth; a second resistor R2 whose one terminal is connected to the source of the first MOS transistor; a third resistor R3 whose one terminal is grounded; and a first node A connected to the other terminals of the first resistor, the second resistor, and the third resistor.

The output block may include: a fourth resistor R4 whose one terminal is connected to the second node; a third node C connected to the other terminal of the fourth resistor; a fifth resistor R5 whose one terminal is connected to the third node and the other terminal is grounded; a first amplifier Amp1 whose non-inverting terminal is connected to the third node and an inverting terminal is applied with a first reference voltage Vr1 and outputting a first signal; and a second amplifier Amp2 whose inverting terminal is connected to the second node and a non-inverting terminal is applied with a second reference voltage Vr2 and outputting a second signal.

The first reference voltage Vr1 applied to the first amplifier may be equal to the second reference voltage Vr2 applied to the second amplifier. In this case, one reference voltage input may be connected to two amplifiers, respectively.

The device for generating three mode signals may further include: as a unit connecting the voltage setting block to the output block, a third amplifier Amp3 whose non-inverting terminal is applied with voltage set in the voltage setting block and an inverting terminal is connected to the second node of the output block; and a second MOS transistor M2 whose drain is applied with the power voltage, gate is connected to an output terminal of the third amplifier, and source is connected to the second node.

According to another exemplary embodiment of the present invention, there is provided a device for generating three mode signals, including: a first resistor R1 whose one terminal is connected to an input terminal receiving three input signals of driving voltage VDD, open OPEN, and ground GND; a first MOS transistor M1 whose gate is applied with a first MOS reference voltage VM1 and drain is applied with power voltage Vs, and having breakdown voltage Vth; a second resistor R2 whose one terminal is connected to the source of the first MOS transistor; a third resistor R3 whose one terminal is grounded; a first node A connected to the other terminals of the first resistor R1, the second resistor R2, and the third resistor R3; a third amplifier Amp3 whose the non-inverting terminal is connected to first node A; a second node B connected to the inverting terminal of the third amplifier Amp3; a second MOS transistor M2 whose drain is connected to the power voltage Vs, gate is connected to the output terminals of the third amplifier Amp3, and source is connected to the second node B; a fourth resistor R4 whose one terminal is connected to the second node B; a third node C connected to the other terminal of the fourth resistor R4; a fifth resistor R5 whose one terminal is connected to the third node C and the other terminal is grounded; a first amplifier Amp1 whose the non-inverting terminal is connected to third node C and an inverting terminal is applied with the first reference voltage Vr1 and outputting the first signal; and a second amplifier Amp2 whose the non-inverting terminal is connected to the second node B and an inverting terminal is applied with the second reference voltage Vr2, and outputting the second signal.

When R4=R5 and Vr1=Vr2, the device for generating three mode signals may be configured to satisfy a condition of VDD×R3/(R1+R3)>2Vr1.

When R4=R5 and Vr1=Vr2, the device for generating three mode signals may be configured to satisfy a condition of Vr1<(VM1−Vth)×R3/(R2+R3)<2Vr1.

When R4=R5 and Vr1=Vr2, the device for generating three mode signals may be configured to satisfy a condition of (VM1−Vth)×(R1//R3)/(R2+(R1//R3))<Vr1.

According to another exemplary embodiment of the present invention, there is provided a method for generating three mode signals, including: receiving three input signals of driving voltage VDD, open OPEN, and ground GND to set three voltages; and comparing the three voltages with a first reference voltage and a second reference voltage, respectively, to output an H signal when the set voltage is higher than the first reference voltage and the second reference voltage and an L signal when the set voltage is lower than the first reference voltage and the second reference voltage, respectively, thereby generating three mode signals of HH, LH, and LL.

According to another exemplary embodiment of the present invention, there is provided a method for generating three mode signals, including: receiving three input signals of driving voltage VDD, open OPEN, and ground GND to set three voltages; and distributing the three voltages to two nodes and comparing the voltage distributed to each node with a reference voltage to output an H signal when the distributed voltage is higher than the reference voltage and an L signal when the distributed voltage is lower than the reference voltage, respectively, thereby generating three mode signals of HH, LH, and LL.

DESCRIPTION OF THE PREFERRED EMBODIMENTS

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Hereinafter, a configuration and an effect of the present invention will be described in more detail with reference to the accompanying drawings.

Figure 1:
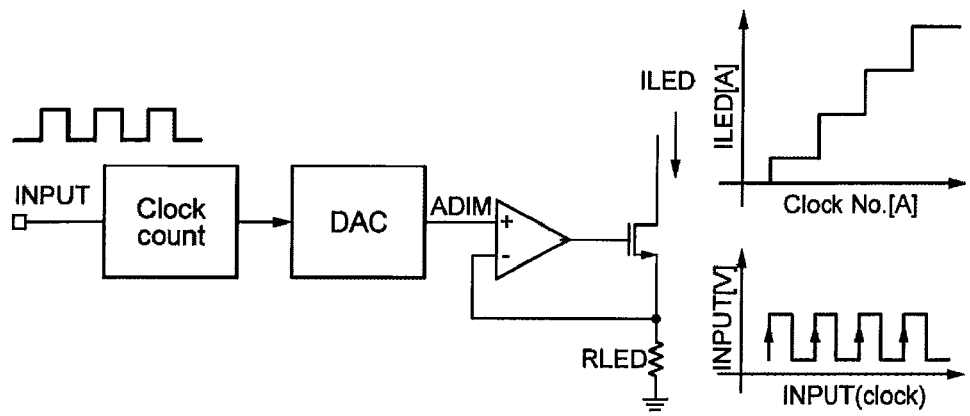
FIG. 1 is a diagram showing a method for controlling an LED current using a digital block.
Figure 2:
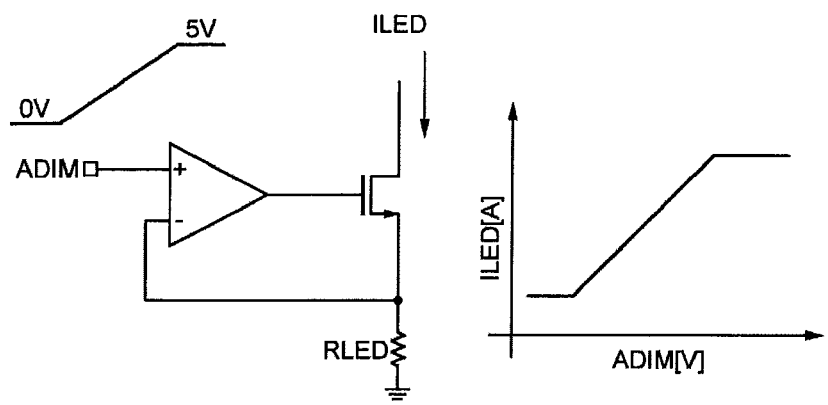
FIG. 2 is a diagram showing a method for controlling an LED current using an analog dimming scheme.
Figure 3:
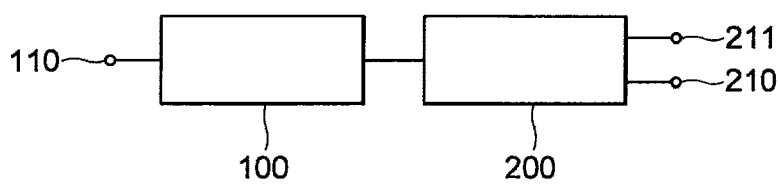
FIG. 3 is a block diagram showing a configuration according to an exemplary embodiment of the present invention.

FIG. 3 is a block diagram showing a configuration of a device for generating three mode signals according to an exemplary embodiment of the present invention and schematically shows a shape in which the device for generating three mode signals is configured to include a voltage setting block 100 and an output block 200.

The voltage setting block 100 includes one input terminal 110 and the output block 200 includes two output terminals.

The voltage setting block 100 is applied with three input signals such as a driving voltage VDD, a ground GND, and an open OPEN through the input terminal 110.

Three voltages are set in the voltage setting block 100 according to the three input signals.

Generally, when the input terminal 110 is opened (or floating mode), a predetermined bias is not defined, such that the voltage of the corresponding mode cannot be definitively set.

The voltage setting block 100 is configured to define the bias of the open mode so that the voltage can be definitively set to the input terminal 110 even in the open mode, in addition to the driving voltage VDD and the ground (GND 0), thereby making it possible to provide the three voltages by using a single pin.

Meanwhile, the output block 200 outputs HH, LH, and LL signals to two output terminals according to the three voltages set in the voltage setting block 100 to control the LED current in the three modes.

Figure 4:
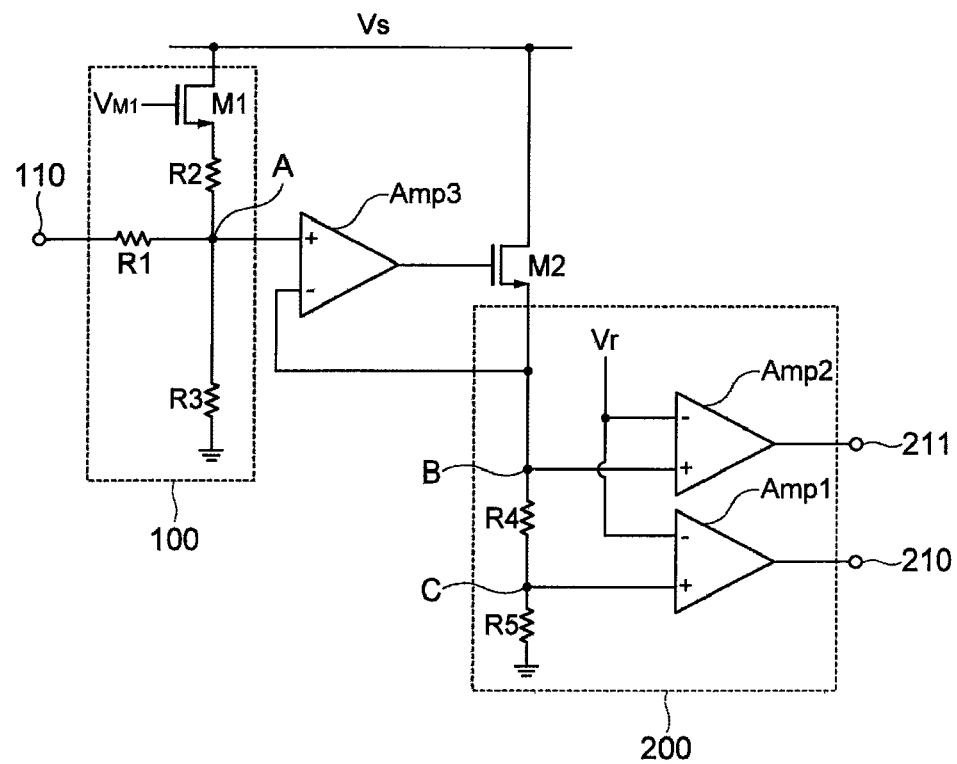
FIG. 4 is a circuit diagram showing a configuration according to another exemplary embodiment of the present invention.

FIG. 4 is a circuit diagram showing a configuration according to another exemplary embodiment of the present invention.

The voltage setting block 100 is configured to include at least three resistors R, wherein one terminal of the first resistor R (R1) is connected to the input terminal 110 and the other terminal thereof is connected to a first node A, one terminal of a second resistor R2 is connected to a drain of a first MOS transistor (M1) and the other terminal thereof is connected to the first node A, and one terminal of a third resistor R3 is grounded and the other terminal thereof is connected to the first node A.

In this configuration, a source of the first MOS transistor M1 is applied with a power voltage and a gate thereof is applied with a first MOS reference voltage Vr1.

Meanwhile, the output block 200 is configured to include a reference voltage, a comparator, and a resistor.

The comparator may generally be implemented by an amplifier Amp and the resistor serves to distribute the voltage set in the voltage setting block 100 into a second node B and a third node C, respectively.

Described in detail, one terminal of a fourth resistor R4 is connected to the second node B, the other thereof is connected to the second node C, and one terminal of a fifth resistor R5 is connected to the third node C and the other terminal thereof is grounded.

The inverting terminals of the first amplifier Amp1 and the second amplifier Amp2 are each applied with a first reference voltage Vr1 and a second reference voltage Vr2 and the non-inverting terminals thereof are each connected to a second node B and a third node C so that the voltage applied to each node is applied to the non-inverting terminals of the amplifiers Amp1 and Amp2 and compares the applied voltage with the reference voltages Vr1 and Vr2 to output H or L signals to the output terminals.

In this case, the first reference voltage Vr1 applied to the first amplifier Amp1 may be equal to the second reference voltage Vr2 applied to the second amplifier Amp2. In this case, a single reference voltage Vr input may be applied to two amplifiers Amp1 and Amp2, thereby simplifying the circuit.

Meanwhile, as a unit connecting the voltage setting block 100 to the output block 200, a third amplifier Amp3 in which the voltage set in the voltage setting block 100 (alternatively, voltage of the first node A) is applied to the non-inverting terminal and the second node B of the output block 200 is connected to the inverting terminal may be provided.

In this configuration, a second MOS transistor M2 whose drain is applied with the power voltage, gate is connected to the output terminal of the third amplifier Amp3, and source is connected to the second node B may be further provided.

The third amplifier Amp3 and the second MOS transistor M2 are provided, such that three classified voltages may be more clearly set in the first node A and the second node B.

The device for generating three mode signals according to another exemplary embodiment of the present invention may be configured to include the first resistor R1 whose one terminal is connected to the input terminal 110 receiving three input signals of driving voltage VDD, open OPEN, and ground GND; the first MOS transistor M1 whose gate is applied with a first MOS reference voltage VM1 and drain is applied with power voltage Vs, and having breakdown voltage Vth; the second resistor R2 whose one terminal is connected to the source of the first MOS transistor; the third resistor R3 whose one terminal is grounded; the first node A connected to the terminals of the first resistor R1, the second resistor R2, and the third resistor R3; the third amplifier whose non-inverting terminal is connected to first node A; the second node B connected to the inverting terminal of the third amplifier Amp3; the second MOS transistor M2 whose drain is connected to the power voltage Vs, gate is connected to the output terminals of the third amplifier Amp3, and source is connected to the second node B; a fourth resistor R4 whose one terminal is connected to the second node B; a third node C connected to the other terminal of the fourth resistor R4; a fifth resistor R5 whose one terminal is connected to the third node C and the other terminal is grounded; the first amplifier Amp1 whose the non-inverting terminal is connected to third node C and an inverting terminal is applied with the first reference voltage Vr1 and outputting the first signal; and a second amplifier Amp2 whose the non-inverting terminal is connected to second node B and an inverting terminal is applied with the second reference voltage Vr2, and outputting the second signal.

Hereinafter, the operation principle and characteristics of the device will be described in detail.

In the present invention, the input terminal 110 is applied with three mode voltages such as VDD, GND, and OPEN and three combined signals of HH, LH, and LL may be generated to the output terminal according to the three voltages.

Hereinafter, there are R4=R5 and Vr1=Vr2 as a precondition for convenience of explanation.

First, when the VDD is input to the input terminal 110, the H signal is output to both the first output terminals 210 (out1) and the second output terminal 220 (out2). In this case, since Vc>Vr1 and VB>2Vr1, a ratio of R1:R3 is determined to satisfy the condition of VDD×R3/(R1+R3)>2Vr1.

Next, when the input terminal 110 is opened, the L signal is output to the first output terminal 210 and the H signal is output to the second output terminal 220. In this case, since VB>Vr1>Vc, the VM1 value and the ratio of R2:R3 are determined to satisfy the condition of Vr1<(VM1−Vth)×R3/(R2+R3)<2Vr1.

Finally, when the input terminal 110 is GND, i.e., the ground state, the L signal is output to both the first output terminal 210 and the second output terminal 220. In this case, since VB<Vr1, the VM1 and the R value are determined to satisfy the condition of (VM1−Vth)×(R1//R3)/(R2+(R1//R3))<Vr1.

Hereinafter, an example configured as the device to satisfy the above-mentioned conditions will be described.

EXPERIMENTAL EXAMPLE 1

R1=0.5, R2=1, R3=3, R4=1, R5=1
VM1=2.5, Vth=0.8, VDD 3, Vr1=1

When the input voltage is VDD, the VM1 does not function and the VA is determined by the VDD. Therefore, VA=VB=3×3/3.5=2.57, Vc=VB/2=1.285, such that the signal combination of H, H is generated.

When the input voltage is opened, the VA is determined by R2:R3 connected to the inside. Therefore, VA=VB=(2.5−0.8)×3/4=1.275, VC=0.6375, such that the signal combination of L and H is generated.

When the input voltage is grounded, VA=VB=(2.5−0.8)/3=0.566, such that the signal combination of L, L is generated.

Figure 5:
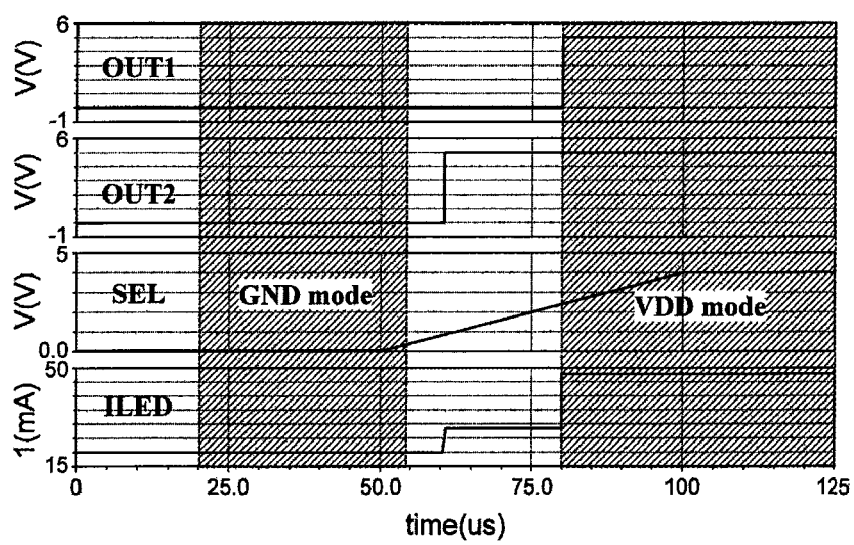
FIGS. 5 and 6 are graphs showing a situation of controlling an LED current according to an experimental example of the present invention.
Figure 6:
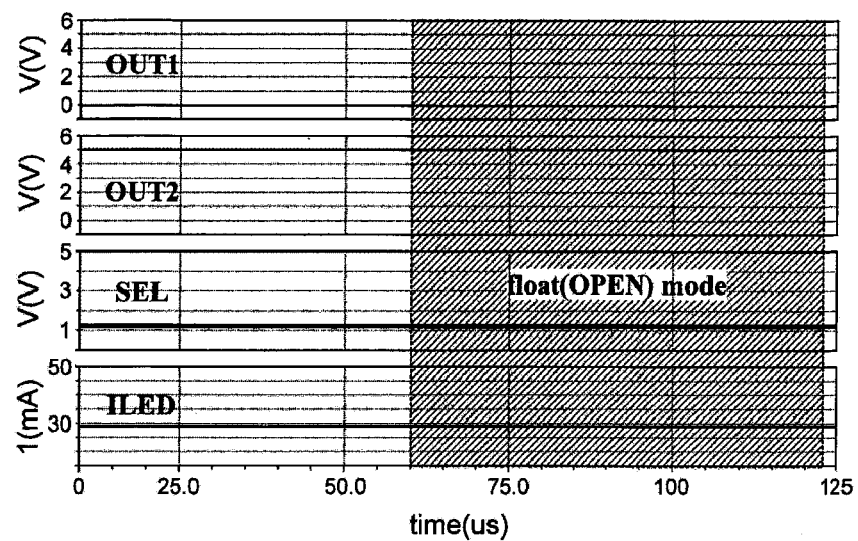

The control situations of the input (SEL) voltage, the first output signal OUT1, the second output signal OUT2, and the LED current (ILED) according to the first experimental example are shown in FIGS. 5 and 6.

As set forth above, the present invention generates the three mode signals by using only a small number of resistors and amplifiers to further reduce the chip size than the related art and does not require an external power source to solve the problems of the related art due to noise.

Further, the present invention can implement the three output signals according to the mode of voltage input to the single pin and separately connect other terminals, if necessary and can additionally use the single wire of the related art or components for analog dimming in parallel.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A device for generating three mode signals, the device comprising:
    a voltage setting block including
        one input terminal configured to receive three input signals of driving voltage, open, and ground,
        a first resistor including a first terminal and a second terminal, the first terminal of the first resistor being connected to the input terminal,
        a first metal oxide semiconductor (MOS) transistor including a gate for receiving a first MOS reference voltage, a drain for receiving a power voltage, and a source, the first MOS transistor having a predetermined breakdown voltage,
        a second resistor including a first terminal and a second terminal, the first terminal of the second resistor being connected to the source of the first MOS transistor,
        a third resistor including a first terminal and a second terminal, the first terminal of the third resistor being grounded, and
        a first node connected to the second terminals of the first resistor, the second resistor, and the third resistor, wherein the voltage setting block is configured to set three voltages based on the three input signals; and
    an output block including two output terminals and a second node configured to receive the three voltages from the voltage setting block, and configured to output three combined signals by comparing each of the three voltages received through the second node with a reference voltage.

2. The device according to claim 1, wherein the output block includes
    a fourth resistor including a first terminal and a second terminal, the first terminal of the fourth resistor being connected to the second node,
    a third node connected to the second terminal of the fourth resistor,
    a fifth resistor including a first terminal and a second terminal, the first terminal of the fifth resistor being connected to the third node and the second terminal of the fifth resistor being grounded,
    a first amplifier including a non-inverting input terminal connected to the third node, an inverting input terminal for receiving a first reference voltage, and an output terminal, the first amplifier configured to output a first signal from the output terminal thereof, and
    a second amplifier including a non-inverting input terminal connected to the second node, an inverting input terminal for receiving a second reference voltage, and an output terminal, the second amplifier configured to output a second signal from the output terminal thereof.

3. The device according to claim 2, wherein the first reference voltage is substantially equal to the second reference voltage.

4. The device according to claim 1, further comprising:
    a third amplifier including a non-inverting input terminal for receiving the three voltages set by the voltage setting block, an inverting input terminal connected to the second node, and an output terminal; and
    a second MOS transistor including a drain for receiving the power voltage, a gate connected to the output terminal of the third amplifier, and a source connected to the second node.

5. A device for generating three mode signals, the device comprising:
    a first resistor including a first terminal and a second terminal, the first terminal of the first resistor being connected to an input terminal to receive three input signals of driving voltage, open, and ground;
    a first metal oxide semiconductor (MOS) transistor including a gate for receiving a first MOS reference voltage, a drain for receiving a power voltage, and a source, the first MOS transistor having a breakdown predetermined voltage;
    a second resistor including a first terminal and a second terminal, the first terminal of the second resistor being connected to the source of the first MOS transistor;
    a third resistor including a first terminal and a second terminal, the first terminal of the third resistor being grounded;
    a first node connected to the second terminals of the first resistor, the second resistor, and the third resistor;
    a first amplifier including a non-inverting input terminal, an inverting input terminal, and an output terminal, the non-inverting input terminal being connected to the first node;
    a second node connected to the inverting input terminal of the first amplifier;
    a second MOS transistor including a drain for receiving a power voltage, a gate connected to the output terminals of the first amplifier, and a source connected to the second node;
    a fourth resistor including a first terminal and a second terminal, the first terminal of the fourth resistor being connected to the second node;
    a third node connected to the second terminal of the fourth resistor;
    a fifth resistor including a first terminal and a second terminal, the first terminal of the fifth resistor being connected to the third node and the second terminal of the fifth resistor being grounded;
    a second amplifier including a non-inverting input terminal connected to the third node, an inverting input terminal for receiving a first reference voltage, and an output terminal, the second amplifier configured to output a first signal; and
    a third amplifier including a non-inverting input terminal connected to the second node, an inverting input terminal for receiving a second reference voltage, and an output terminal, the third amplifier configured to output a second signal, wherein
    a following condition is satisfied
    $VDD \times R3/(R1+R3) > 2Vr1$, $Vr1 < (VM1-Vth) \times R3/(R2+R3) < 2Vr1$, and
$(VM1-Vth) \times (R1//R3)/(R2+(R1//R3)) < Vr1$, where $R=R5$ and $Vr1=Vr2$ and R1 is resistance of the first resistor, R2 is resistance of the second resistor, R3 is resistance of the third resistor, VDD is the driving voltage, Vr1 is the first reference voltage, Vr2 is the second reference voltage, VM1 is the first MOS reference voltage, and Vth is the breakdown voltage.

6. A device for generating three mode signals, the device comprising:

a voltage setting block including
one input terminal configured to receive three input signals of high voltage, open, and low voltage,
a first resistor including a first terminal and a second terminal, the first terminal of the first resistor being connected to the input terminal,
a first metal oxide semiconductor (MOS) transistor including a gate for receiving a first MOS reference voltage, a drain for receiving a power voltage, and a source, the first MOS transistor having a predetermined breakdown voltage,
a second resistor including a first terminal and a second terminal, the first terminal of the second resistor being connected to the source of the first MOS transistor,
a third resistor including a first terminal and a second terminal, the first terminal of the third resistor being grounded, and
a first node connected to the second terminals of the first resistor, the second resistor, and the third resistor, wherein the voltage setting block is configured to set three voltages based on the three input signals; and an output block including two output terminals and a second node configured to receive the three voltages from the voltage setting block, and configured to output three combined signals of high-high, low-high, and low-low voltages by comparing each of the three voltages received through the second node with a reference voltage.

* * * * *